US009336357B2

(12) United States Patent
Smith et al.

(10) Patent No.: US 9,336,357 B2
(45) Date of Patent: May 10, 2016

(54) SECURE ACCESS MANAGEMENT OF DEVICES

(71) Applicants: Ned Smith, Hillsboro, OR (US); Purushottam Goel, Beaverton, OR (US); Victoria Moore, Phoenix, AZ (US)

(72) Inventors: Ned Smith, Hillsboro, OR (US); Purushottam Goel, Beaverton, OR (US); Victoria Moore, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/629,881

(22) Filed: Sep. 28, 2012

(65) Prior Publication Data

US 2014/0096231 A1    Apr. 3, 2014

(51) Int. Cl.
G06F 21/00 (2013.01)
G06F 21/35 (2013.01)
G06F 21/82 (2013.01)

(52) U.S. Cl.
CPC ............. *G06F 21/00* (2013.01); *G06F 21/35* (2013.01); *G06F 21/82* (2013.01); *G06F 2221/2137* (2013.01)

(58) Field of Classification Search
None
See application file for complete search history.

(56) References Cited

U.S. PATENT DOCUMENTS

| | | | | |
|---|---|---|---|---|
| 5,603,050 A * | 2/1997 | Wolford | ................. | G06F 13/28 710/1 |
| 6,189,105 B1 * | 2/2001 | Lopes | ........................... | 726/20 |
| 6,332,197 B1 * | 12/2001 | Jadav | ................. | G06F 11/1076 714/6.1 |
| 6,484,262 B1 | 11/2002 | Herzi | | |
| 7,096,333 B2 | 8/2006 | McBrearty et al. | | |
| 7,249,381 B2 | 7/2007 | Telesco | | |
| 7,378,939 B2 * | 5/2008 | Sengupta et al. | ............ | 340/5.64 |
| 7,567,103 B2 * | 7/2009 | Park | ...................... | H03L 7/0812 327/149 |
| 7,590,767 B2 | 9/2009 | Fujita et al. | | |
| 7,657,746 B2 | 2/2010 | Paramasivam et al. | | |
| 7,757,070 B1 * | 7/2010 | Kang et al. | .................... | 712/228 |
| 7,792,544 B2 * | 9/2010 | Vogedes et al. | ............ | 455/550.1 |
| 8,041,346 B2 | 10/2011 | Tyhurst et al. | | |
| 8,229,628 B2 * | 7/2012 | Sakakura | .......... | B60R 25/02153 701/41 |
| 2004/0024920 A1 * | 2/2004 | Gulick | .................... | G06F 11/26 710/1 |
| 2004/0039937 A1 | 2/2004 | Aissi et al. | | |
| 2004/0167984 A1 | 8/2004 | Herrmann | | |
| 2005/0193144 A1 * | 9/2005 | Hassan et al. | ................. | 709/238 |

(Continued)

FOREIGN PATENT DOCUMENTS

| | | |
|---|---|---|
| CN | 1897006 A | 1/2007 |
| CN | 101681257 A | 3/2010 |

(Continued)

OTHER PUBLICATIONS

International Search Report for PCT Application No. PCT/US2011/043411, mailed on Feb. 9, 2012, 3 pages.

(Continued)

*Primary Examiner* — Farid Homayounmehr
*Assistant Examiner* — Maung Lwin
(74) *Attorney, Agent, or Firm* — Jordan IP Law, LLC

(57) ABSTRACT

Systems and methods may provide implementing one or more device locking procedures to block access to a device. In one example, the method may include receiving an indication that a user is no longer present, initiating a timing mechanism to set a period to issue a first device lock instruction to lock a peripheral device, relaying timing information from the timing mechanism to a controller module associated with the peripheral device; and locking the peripheral device upon expiration of the period.

27 Claims, 3 Drawing Sheets

(56) References Cited

U.S. PATENT DOCUMENTS

| | | |
|---|---|---|
| 2006/0064695 A1* | 3/2006 | Burns et al. .................. 718/100 |
| 2006/0085847 A1* | 4/2006 | Ikeuchi et al. .................... 726/6 |
| 2006/0190985 A1 | 8/2006 | Vasishth et al. |
| 2006/0259782 A1 | 11/2006 | Wang et al. |
| 2007/0016801 A1 | 1/2007 | Bade et al. |
| 2007/0061561 A1 | 3/2007 | Hashiguchi |
| 2007/0112772 A1 | 5/2007 | Morgan et al. |
| 2007/0198844 A1 | 8/2007 | Morawetz et al. |
| 2008/0052777 A1 | 2/2008 | Kawano et al. |
| 2008/0162809 A1 | 7/2008 | Rothman et al. |
| 2008/0271015 A1 | 10/2008 | Ibrahim |
| 2008/0288782 A1 | 11/2008 | Iyer |
| 2009/0070467 A1 | 3/2009 | Khosravi et al. |
| 2010/0107238 A1 | 4/2010 | Stedman et al. |
| 2010/0169640 A1 | 7/2010 | Smith et al. |
| 2011/0154023 A1 | 6/2011 | Smith et al. |
| 2011/0191834 A1 | 8/2011 | Singh et al. |
| 2012/0240195 A1* | 9/2012 | Weiss .................. H04L 63/0846 726/4 |

FOREIGN PATENT DOCUMENTS

| | | |
|---|---|---|
| EP | 2204754 A1 | 7/2010 |
| JP | 2004070875 A | 3/2004 |
| JP | 2004355137 A | 12/2004 |
| JP | 2006268861 A | 10/2006 |
| JP | 2007066123 A | 3/2007 |
| JP | 2007148466 A | 6/2007 |
| JP | 2008052704 A | 3/2008 |
| WO | 2012009231 A2 | 1/2012 |

OTHER PUBLICATIONS

Written Opinion for PCT Application No. PCT/US2011/043411, mailed on Feb. 9, 2012, 4 pages.

International Preliminary Report on Patentability for PCT Application No. PCT/US2011/043411, mailed on Feb. 9, 2012, 5 pages.

* cited by examiner

SECURE ACCESS MANAGEMENT OF DEVICES

BACKGROUND

1. Technical Field

Embodiments generally relate to device security. More particularly, embodiments relate to implementing one or more device locking procedures to block access to a device.

2. Discussion

Typically, when a user leaves a vicinity of a device (e.g., a desktop computer), the user may not be able to monitor others who may have access to the device. In some cases, the device may use a device lock mechanism that initiates after a predetermined period of user inactivity. This approach may require the user (or an administrator), however, to predict the period of user inactivity that best balances security concerns and usability. Moreover, if the security of the device has been compromised (e.g., by malware), the device may be prevented from implementing a device lock altogether.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
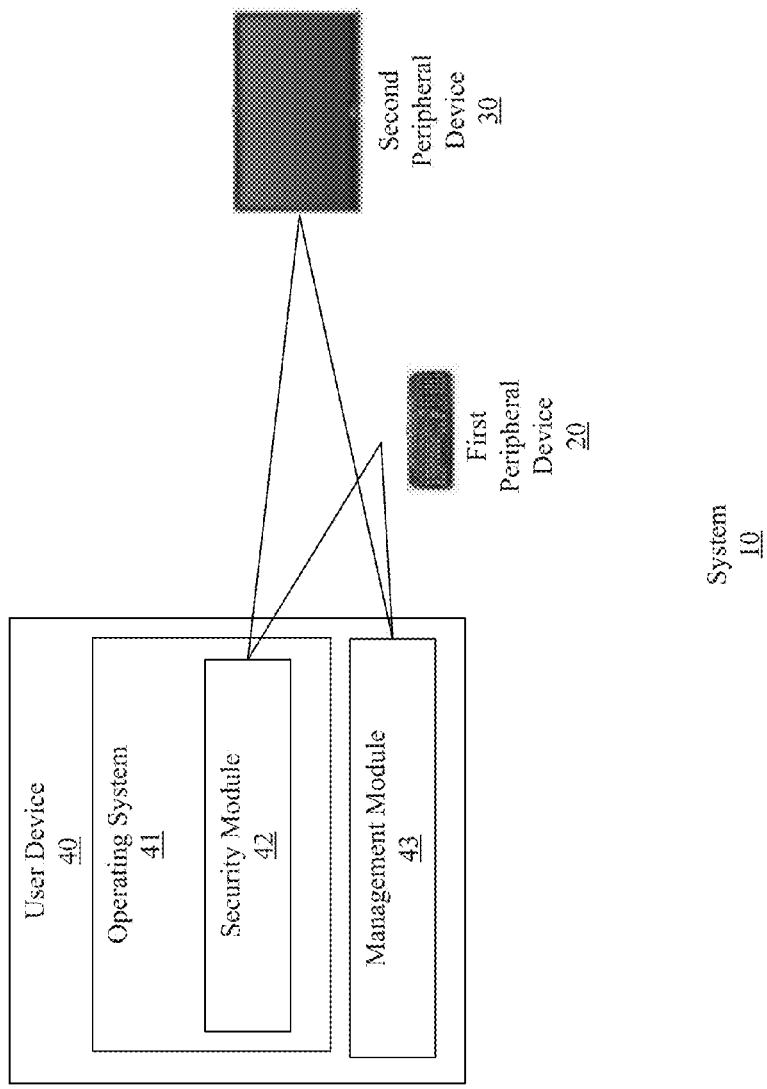
FIG. 1 is a block diagram of an example of a first system implementing multiple device locking procedures to block access to a device according to an embodiment.

FIG. 1 is a block diagram of an example of a first system 10 implementing multiple device locking procedures to block access to a device. The illustrated system 10 includes a first peripheral device 20, a second peripheral device 30, and a user device 40.

The first peripheral device 20 and the second peripheral device 30 may be auxiliary devices configured to work with the user device 40. In this example, the first peripheral device 20 may be a keyboard, and the second peripheral device 30 may be a display device.

The user device 40 may be any programmable machine that may carry out a sequence of logical operations. Examples of the user device 40 may include a notebook computer, desktop computer, personal digital assistant (PDA), media player, a mobile Internet device (MID), any smart device such as a smart phone, smart tablet, or the like. In this example, the user device 40 may be a desktop computer. The user device 40 may include an operating system (OS) 41 and a management module 43.

The OS 41 may be a collection of software that manages computer hardware resources and provides common services for computer programs on the user device 40. The OS 41 may include a security module driver 42. The security module driver 42 may also be configured to issue one or more instructions to implement a device lock on the first peripheral device 20 and the first second peripheral device 30.

The management module 43 may be configured to, among other things, manage access rights of the first peripheral device 20 and the second peripheral device 30. For example, the management module 43 may be configured to implement a device lock on the first peripheral device 20 and the second peripheral device 30 in order to block their access to the user device 40.

So, in this example, if a user of the user device 40 leaves its vicinity, the OS 41 may be configured to implement a first timer to monitor a predetermined period of user inactivity. If the period expires, the security module driver 42 may be configured to issue a device lock instruction on the first peripheral device 20 and the first second peripheral device 30.

In addition, in this example, if the user leaves, the management module 43 may be configured to detect that the user is no longer present. Upon detecting such an event, the management module 43 may implement a timer and monitor whether access to the first peripheral device 20 and the second peripheral device 30 has been blocked (e.g., by the security module driver 42). If, after a period set by the timer expires, access to the first peripheral device 20 and the second peripheral device 30 has not been blocked, the management module 43 may be configured to step in and implement a device lock on these devices. So, for example, if security of the OS 41 has been compromised by malware that may render the security module driver 42 unable to implement a device lock, the management module 43 may be configured to step in and implement the device lock to prevent unauthorized access to the user device 40.

Figure 2:
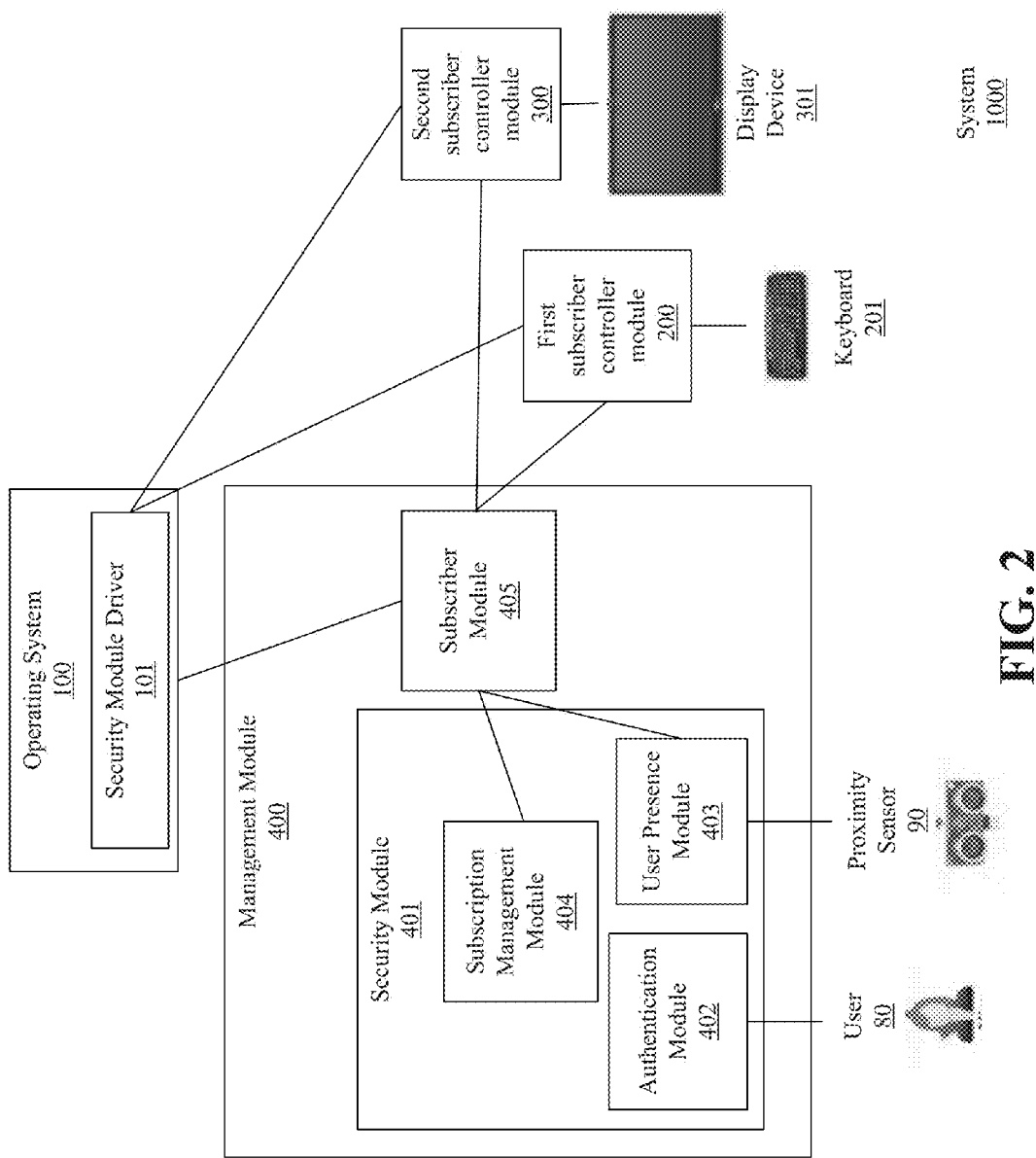
FIG. 2 is a block diagram of an example of a second system implementing multiple device locking procedures to block access to a device according to an embodiment.

FIG. 2 is a block diagram of an example of a second system 1000 that implements multiple device locking procedures to block access to a device. The illustrated system 1000 includes an OS 100, a first subscriber controller module 200, a second subscriber controller module 300, and a management module 400. As will be discussed in greater detail, the OS 100, the first subscriber controller module 200, the second subscriber controller module 300, and the management module 400 may be configured to manage the access of peripheral devices, such as a keyboard 201 and a display device 301.

The OS 100 may be a collection of software that manages computer hardware resources and provides common services for computer programs on a user device. The OS 100 may include a security module driver 101. In one example, the security module driver 101 of the OS 100 may be configured to issue an instruction to implement a device lock on the keyboard 201 and the display device 301 after a predetermined period of user inactivity.

The first subscriber controller module 200 and the second subscriber controller module 300 may interface with the keyboard 201 and the display device 301 respectively. Among other things, the first subscriber controller module 200 and the second subscriber controller module 300 may receive an instruction and implement a device lock on the keyboard 201 and the display device 301.

So, for example, after the expiration of a predetermined period of user inactivity, the first subscriber controller module 200 and the second subscriber controller module 300 may receive device lock instructions from the security module driver 101 to lock the keyboard 201 and the display device 301. In the case of the keyboard 201, the device lock may include precluding the keyboard 201 from receiving further input. In the case of the display device 301, the device lock may include locking access to the display screen, and displaying a lock screen.

The management module 400 may be configured to manage security and subscribers of a user device, such as the user device 40 (FIG. 1). The management module 400 may include a security module 401 to manage security of the user device, and a subscriber module 405 to manage subscribers of the user device. The security module 401 may include an authentication module 402, a user presence module 403, and a subscription management module 404.

The authentication module 402 may be configured to receive user-related information to authenticate a user 80. So, in this example, the authentication module 402 may be configured to receive a security code from the user 80 via an input device (e.g., a keypad), and compare it to a valid, known security code. In another example, the authentication module may utilize a smart card affiliated with the user 80 to conduct key exchange process. In still another example, the authentication module may utilize a biometric authentication process. The relationship of the input devices and the authentication module 402 may be secure, in that they may be configured to be resistant to attacks from malware.

The user presence module 403 may be configured to monitor the presence of the user 80. In one example, the user presence module 403 may utilize a proximity sensor 90 (e.g., an ultrasonic sensor, an infrared sensor, etc.) to detect whether the user 80 is present. The relationship of the proximity sensor 90 and the user presence module 403 may be secure, in that they may be configured to be resistant to attacks from malware.

The subscription management module 404 may be configured to manage subscribers of the management module 400. A subscriber may include an entity (e.g., a component, a device, etc.) that may rely on operational instructions from the subscription management module 404. In this example, the subscribers may include the keyboard 201 and the display device 301.

The subscriber module 405 may be configured to receive management information from the subscription management module 404, monitor access to the keyboard 201 and the display device 301, and issue instructions relating to access rights of the keyboard 201 and the display device 301.

So, as will be discussed in greater detail, the subscriber module 405 may receive information regarding the presence of the user 80 from the user presence module 403. If the user presence module 403 determines that the user 80 is not present (i.e., via the proximity sensor 90), the subscriber module 405 may set a timer. The first subscriber controller module 200 and the second subscriber controller module 300 may be configured to receive the timer information.

If the timer expires, and an instruction from the security module driver 101 has not resulted in a device lock of the keyboard 201 and the display 301 (e.g., after a predetermined period of inactivity), the subscriber module 405 may be configured communicate directly with the first subscriber module 200 and the second subscriber module 300 to implement a device lock on the keyboard 201 and the display device 301 respectively.

The arrangement and numbering of blocks depicted in FIG. 2 is not intended to imply an order of operations to the exclusion of other possibilities. Those of skill in the art will appreciate that the foregoing systems and methods are susceptible of various modifications and alterations. For example, in another embodiment, a security module driver may communicate with a management module to implement a device lock. In such a case, a timer associated with a subscriber module of the management module may be reset upon the device lock.

Figure 3:
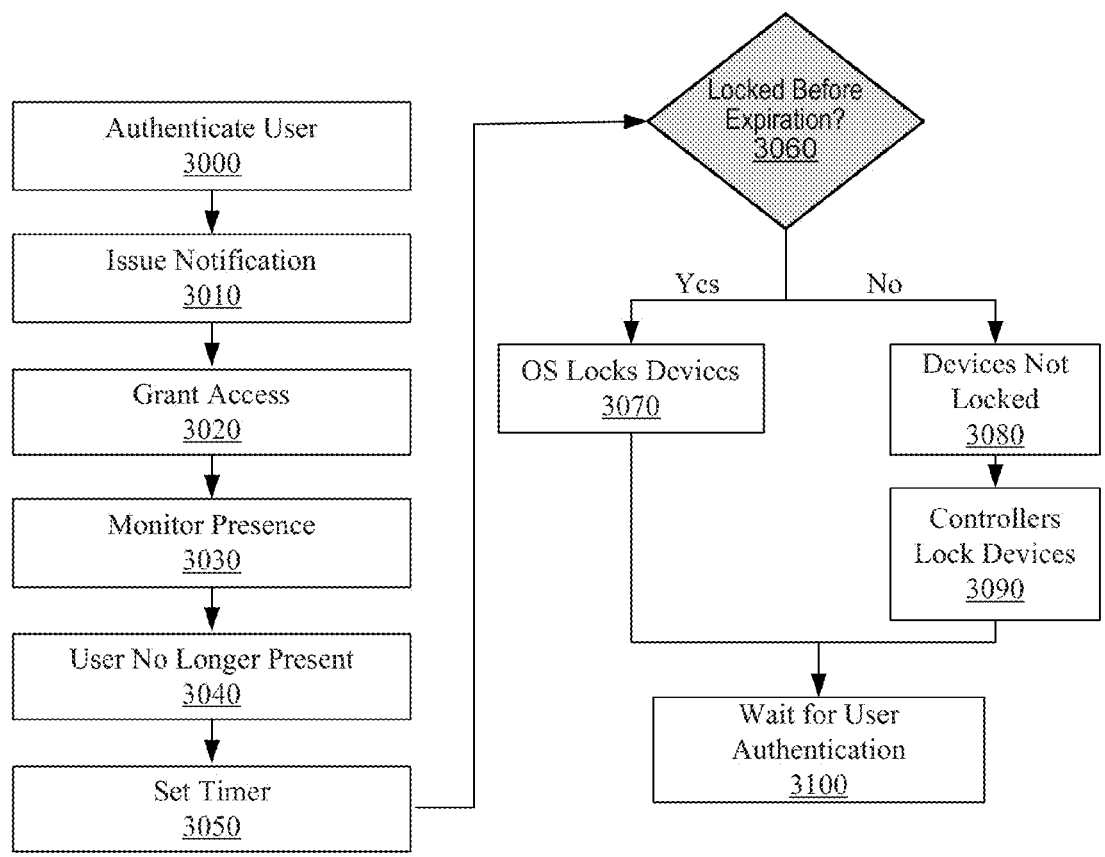
FIG. 3 is a flowchart of an example of a method of implementing multiple locking device procedures to block access to a device according to an embodiment.

FIG. 3 is a flowchart of an example of a method of implementing multiple device locking procedures to block access to a device. In this example, a management module, such as the management module 400 (FIG. 2), may authenticate a user, and allow the user access to system resources, such as the keyboard 201 (FIG. 2) and the display device 301 (FIG. 2). In addition, upon detecting that the user may no longer be present, the management module may be configured to communicate with an OS, such as the OS 100 (FIG. 2), a first subscriber module, such as the first subscriber module 200 (FIG. 2), and a second subscriber module, such as the second subscriber module 300 (FIG. 2), to manage access rights of the system resources.

The method might be implemented as a set of logic instructions stored in a machine- or computer-readable storage medium such as, for example, random access memory (RAM), read only memory (ROM), programmable ROM (PROM), firmware, flash memory, etc., in configurable logic such as programmable logic arrays (PLAs), field programmable gate arrays (FPGAs), complex programmable logic devices (CPLDs), in fixed-functionality logic hardware using circuit technology such as application specific integrated circuit (ASIC), complementary metal oxide semiconductor (CMOS) or transistor-transistor logic (TTL) technology, or any combination thereof. For example, computer program code to carry out operations shown in the method may be written in any combination of one or more programming languages, including an object oriented programming language such as, for example, Java, Smalltalk, C++ or the like and conventional procedural programming languages, such as the "C" programming language or similar programming languages.

At processing block 3000, an authentication module, such as the authentication module 402 (FIG. 2), may authenticate the user utilizing a security code. At processing block 3010, a security module, such as the security module 401 (FIG. 2), may issue a notification to a security module driver, such as the security module driver 101 (FIG. 2), that the user has been authenticated. The security module may be part of an OS, such as the OS 100 (FIG. 2). At processing block 3020, the security module driver may grant the user access to the keyboard and the display device.

At processing block 3030, a proximity module, such as the proximity module 403 (FIG. 2), may monitor the user's presence. The proximity module may continuously communicate user presence information to a subscriber module, such as the subscriber module 405 (FIG. 2). The subscriber module may, in turn, relay the user presence information to the first subscriber controller module and the second subscriber controller module.

At processing block 3040, the proximity module may detect that the user is no longer present.

At processing block 3050, upon detecting that the user may no longer be present, the subscriber module may set a timer. The timing information of the timer may be relayed to the first subscriber controller module and the second subscriber controller module. At processing block 3060, the process may continue based on whether the security module driver locks access to the keyboard and the display device before the expiration of the timer.

At processing block 3070, after a predetermined period of user inactivity, the subscriber module may send a lock notification to the security module driver of the OS. The security module may, in turn, issue an instruction to the first subscriber controller module and the second subscriber controller module to lock the keyboard and the display device respectively. Upon receiving the instruction, the first subscriber controller module may block keyboard input. Similarly, upon the receiving the instruction, the second subscriber controller module may lock the display device, and display a lock screen on the display device. In another example, the device locking process may further include flushing buffer content (e.g., display buffers), and to transitioning the system to a low-power state.

However if, at processing block 3080, the security module fails to lock the keyboard and the display device before upon expiration of the timer, the first subscriber controller module and the second subscriber controller module may recognize the expiration of the timer via the information relayed from the subscriber module. At this point, at processing block 3090, the first subscriber controller module may implement a device lock on the keyboard (i.e., may block keyboard input), and the second subscriber controller module may implement a lock on the display device (i.e., may lock the display device, and display a lock screen on the display device). In another example, the device locking process may further include flushing buffer content (e.g., display buffers), and to transitioning the system to a low-power state. At processing block 3100, the system may wait for the user authentication (i.e., similar to processing block 3000).

Embodiments may therefore provide for an apparatus including a security module deriver, an authentication module, a user presence module, and a subscription module. The security module driver may issue a first device lock instruction to lock a peripheral device after a predetermined period of user inactivity. The authentication module may verify an identity of a user, and the user presence module to monitor the user's presence. The subscription module may receive an indication that the user is no longer present and initiate a timing mechanism to set a period to issue a second device lock instruction to lock the peripheral device. In addition, the subscription module may relay timing information from the timing mechanism to a controller module associated with the peripheral device, wherein the controller module is to automatically implement a device lock on the peripheral device upon expiration of the period.

In one example, the authentication module is to verify the identity of the user via one or more of a security code, a key exchange process, and biometric authentication.

In another example, the user presence module is to utilize user presence data received via a secure connection from one or more of a sensor and a device associated with the user.

In one example, the peripheral device is one of a keyboard and a display device.

In still another example, the controller module is to flush a data buffer of content.

Another embodiment may provide for at least one computer readable storage medium comprising a set of instructions which, if executed by a processor, cause a computer to receive an indication that a user is no longer present, initiate a timing mechanism to set a period to issue a first device lock instruction to lock a peripheral device, and relay timing information from the timing mechanism to a controller module associated with the peripheral device.

In one example, the set of instructions cause a computer to implement a device lock on the peripheral device upon expiration of the period.

In another example, the set of instructions cause a computer to issue a second device lock instruction to lock a peripheral device after a predetermined period of user inactivity.

In one example, the set of instructions cause a computer to verify an identity of the user.

In still another example, verifying the identity of the user is to utilize one or more of a security code, a key exchange process, and biometric authentication.

In yet another example, the set of instructions cause a computer to monitor the user's presence.

In one example, user presence data received via a secure connection from one or more of a sensor and a device associated with the user is to be used to monitor the user's presence.

In another example, the set of instructions cause a computer to flush a data buffer of content.

Still another embodiment may provide for an apparatus comprising a subscription module including first logic to receive an indication that a user is no longer present and second logic to initiate a timing mechanism to set a period to issue a first device lock instruction to lock a peripheral device. The subscription module may also include third logic to relay timing information from the timing mechanism to a controller module associated with the peripheral device, wherein the controller module is to automatically implement a device lock on the peripheral device upon expiration of the period.

In one example, the apparatus includes a security module driver to issue a second device lock instruction to lock a peripheral device after a predetermined period of user inactivity.

In another example, the apparatus includes an authentication module to verify an identity of the user.

In one example, the authentication module is to verify the identity of the user via one or more of a security code, a key exchange process, and biometric authentication.

In still another example, the apparatus includes a user presence module to monitor the user's presence.

In another example, the user presence module is to utilize user presence data received via a secure connection from one or more of a sensor and a device associated with the user.

In another example, the peripheral device is one of a keyboard and a display device.

In still another example, the controller module is to flush a data buffer of content.

Yet another embodiment may provide for a method comprising receiving an indication that a user is no longer present and initiating a timing mechanism to set a period to issue a first device lock instruction to lock a peripheral device. The method may also provide for relaying timing information from the timing mechanism to a controller module associated with the peripheral device and locking the peripheral device upon expiration of the period.

In one example, the method includes locking the peripheral device after a predetermined period of user inactivity.

In another example, the method includes verifying an identity of the user.

In still another example, the method includes verifying the identity of the user is via one or more of a security code verification process, a key exchange process, and biometric authentication.

In one example, the method includes monitoring the user's presence.

In still another example, the method includes monitoring the user's presence includes utilizing user presence data received via a secure connection from one or more of a sensor and a device associated with the user.

In yet another example, the peripheral device is one of a keyboard and a display device.

In still another example, the method includes flushing a data buffer of content.

Techniques described herein may therefore provide for cleaning sensitive information in graphics display buffers, as well as preventing unauthenticated users from providing input except for authentication challenges/responses. Moreover, screen locking control can correspond to an interval when the user is in close proximity of the platform. Additionally, presence-based auto lock actions may be applied in the context of an authenticated/authorized user. Indeed, chipset secure elements may have trusted path connectivity with the sensors, authentication devices, USB (Universal Serial Bus), locking mechanisms and integrated graphics engines resulting in a platform that is highly resistant to malicious tampering by host malware and where authorized users can maintain control of the platform.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. An apparatus comprising a hardware processor to implement:
   a security module driver to issue a first device lock instruction to lock a peripheral device after a predetermined period of user inactivity
   an authentication logic to verify an identity of a user
   a user presence logic to monitor the user's presence and
   a subscription logic to,
      receive an indication that the user is no longer present,
      initiate a timing mechanism in response to the indication that the user is no longer present to set a period within which the first device lock instruction is implementable to lock the peripheral device and upon expiration of which a device lock is to be implemented to lock the peripheral device when the first device lock instruction fails to lock the peripheral device, and
      relay timing information from the timing mechanism to a controller logic associated with the peripheral device,
         wherein the controller logic is to recognize the expiration of the period and automatically lock the peripheral device when the first device lock instruction to lock the peripheral device fails to lock the peripheral device before the expiration of the period.

2. The apparatus of claim 1, wherein the authentication logic is to verify the identity of the user via one or more of a security code, a key exchange process, and biometric authentication.

3. The apparatus of claim 1, wherein the user presence logic is to utilize user presence data received via a secure connection from one or more of a sensor and a device associated with the user.

4. The apparatus of claim 1, wherein the peripheral device is one of a keyboard and a display device.

5. The apparatus of claim 1, wherein the controller logic is to flush a data buffer of content.

6. The apparatus of claim 1, wherein the subscription logic is further to send a lock notification to the security module driver after the predetermined period of user inactivity, and wherein the security module driver is further to issue the first device lock instruction to lock the peripheral device after the predetermined period of user inactivity in response to the lock notification.

7. The apparatus of claim 1, wherein the controller logic is to receive a second device lock instruction to lock the peripheral device.

8. At least one non-transitory computer readable storage medium comprising a set of instructions which, if executed by a processor, cause a computer to:
   issue a first device lock instruction to lock a peripheral device after a predetermined period of user inactivity;
   receive an indication that a user is no longer present;
   initiate a timing mechanism in response to the indication that the user is no longer present to set a period within which the first device lock instruction is to be implementable to lock the peripheral device and upon expiration of which a device lock is to be implemented to lock the peripheral device when the first device lock instruction fails to lock the peripheral device; and
   relay timing information from the timing mechanism to a controller logic associated with the peripheral device, wherein the controller logic is to recognize the expiration of the period and automatically lock the peripheral device when the first device lock instruction to lock the peripheral device fails to lock the peripheral device before the expiration of the period.

9. The at least one computer readable storage medium of claim 8, wherein, if executed, the set of instructions cause a computer to verify an identity of the user.

10. The at least one computer readable storage medium of claim 9, wherein verifying the identity of the user is to utilize one or more of a security code, a key exchange process, and biometric authentication.

11. The at least one computer readable storage medium of claim 8, wherein, if executed, the set of instructions cause a computer to monitor the user's presence.

12. The at least one computer readable storage medium of claim 11, wherein user presence data received via a secure connection from one or more of a sensor and a device associated with the user is to be used to monitor the user's presence.

13. The at least one computer readable storage medium of claim 8, wherein, if executed, the set of instructions cause a computer to flush a data buffer of content.

14. An apparatus comprising a hardware processor to implement:
   a security module driver to issue a first device lock instruction to lock a peripheral device after a predetermined period of user inactivity, and
   a subscription logic including,
      first logic to receive an indication that a user is no longer present,
      second logic to initiate a timing mechanism in response to the indication that the user is no longer present to set a period within which the first device lock instruction is to be implementable to lock the peripheral device and upon expiration of which a device lock is to be implemented to lock a peripheral device when the first device lock instruction fails to lock the peripheral device, and
      third logic to relay timing information from the timing mechanism to a controller logic associated with the peripheral device, wherein the controller logic is to recognize the expiration of the period and automatically lock the peripheral device when the first device lock instruction to lock the peripheral device fails to lock the peripheral device before the expiration of the period.

15. The apparatus of claim 14, further including an authentication logic to verify an identity of the user.

16. The apparatus of claim 15, wherein the authentication logic is to verify the identity of the user via one or more of a security code, a key exchange process, and biometric authentication.

17. The apparatus of claim 14, further including a user presence logic to monitor the user's presence.

18. The apparatus of claim 17, wherein the user presence logic is to utilize user presence data received via a secure connection from one or more of a sensor and a device associated with the user.

19. The apparatus of claim 14, wherein the peripheral device is one of a keyboard and a display device.

20. The apparatus of claim 14, wherein the controller logic further is to flush a data buffer of content.

21. A method comprising:
issuing a first device lock instruction to lock a peripheral device after a predetermined period of user inactivity;
receiving an indication that a user is no longer present;
initiating a timing mechanism in response to the indication that the user is no longer present to set a period within which the first device lock instruction is to be implementable to lock the peripheral device and upon expiration of which a device lock is to be implemented to lock the peripheral device when the first device lock instruction fails to lock the peripheral device;
relaying timing information from the timing mechanism to a controller logic associated with the peripheral device; and
recognizing the expiration of the period and automatically locking the peripheral device when the first device lock instruction to lock the peripheral device fails to lock the peripheral device before the expiration of the period.

22. The method of claim 21, further including verifying an identity of the user.

23. The method of claim 22, wherein verifying the identity of the user is via one or more of a security code verification process, a key exchange process, and biometric authentication.

24. The method of claim 21, further including monitoring the user's presence.

25. The method of claim 24, wherein monitoring the user's presence includes utilizing user presence data received via a secure connection from one or more of a sensor and a device associated with the user.

26. The method of claim 21, wherein the peripheral device is one of a keyboard and a display device.

27. The method of claim 21, further including flushing a data buffer of content.

* * * * *